(12) United States Patent
Safai et al.

(10) Patent No.: US 10,350,839 B2
(45) Date of Patent: Jul. 16, 2019

(54) REMOTE ADVANCED REPAIR GUIDANCE

(71) Applicant: The Boeing Company, Chicago, IL (US)

(72) Inventors: Morteza Safai, Newcastle, WA (US); Gary E. Georgeson, Tacoma, WA (US)

(73) Assignee: The Boeing Company, Chicago, IL (US)

(*) Notice: Subject to any disclaimer, the term of this patent is extended or adjusted under 35 U.S.C. 154(b) by 667 days.

(21) Appl. No.: 14/719,141

(22) Filed: May 21, 2015

(65) Prior Publication Data
US 2016/0339652 A1 Nov. 24, 2016

(51) Int. Cl.
B29C 70/74 (2006.01)
B29C 73/12 (2006.01)
(Continued)

(52) U.S. Cl.
CPC ............ *B29C 70/745* (2013.01); *B24B 49/12* (2013.01); *B29C 69/001* (2013.01); *B29C 73/12* (2013.01); *B29C 73/26* (2013.01); *G05B 19/048* (2013.01); *G06F 3/1454* (2013.01); *B29C 73/10* (2013.01); *B29C 2073/264* (2013.01); *B29K 2067/00* (2013.01); *B29K 2105/12* (2013.01); *B29K 2309/08* (2013.01); *B29L 2009/00* (2013.01);
(Continued)

(58) Field of Classification Search
CPC ........ G06T 2207/10016; G01B 11/303; B29C 2017/264; G03F 7/0037
USPC .................................. 382/103, 108; 700/245
See application file for complete search history.

(56) References Cited

U.S. PATENT DOCUMENTS 4,987,700 A 1/1991 Westerman et al.
5,207,541 A 5/1993 Westerman et al.
(Continued)

FOREIGN PATENT DOCUMENTS

EP 2765502 A1 * 8/2014 ............. G06F 3/147
EP 2765502 A1 * 8/2014 ............. G06F 3/147

OTHER PUBLICATIONS

Extended European Search Report in European Application No. 16170801.1 (European counterpart of the instant application) dated Oct. 25, 2016.
(Continued)

*Primary Examiner* — Giovanna B Colan
(74) *Attorney, Agent, or Firm* — Ostrager Chong Flaherty & Broitman P.C.

(57) ABSTRACT

Systems and processes for enabling an off-site expert to interact with an on-site technician during repair of composite structure. The off-site expert can provide real-time guidance to an on-site technician before and during the performance of repair procedures to avoid errors. The off-site expert is also able to monitor the repair procedures in real time to verify that correct procedures are being employed. In particular, the systems and processes disclosed herein can provide direct visual guidance, feedback, and out-of-plan warnings for manual or automated scarfing and other operations during repair of composite structure. In some embodiments, the repair process combines optical three-dimensional surface measurement, illumination by at least one of visible, ultraviolet and infrared light, and digital light processing projection to provide step-by-step monitoring of the repair.

10 Claims, 10 Drawing Sheets

(51) Int. Cl.
  *B29C 73/26*    (2006.01)
  *G06F 3/14*     (2006.01)
  *B24B 49/12*    (2006.01)
  *B29C 69/00*    (2006.01)
  *G05B 19/048*   (2006.01)
  *B29C 73/10*    (2006.01)
  *B29K 67/00*    (2006.01)
  *B29K 105/12*   (2006.01)
  *B29K 309/08*   (2006.01)
  *B29L 9/00*     (2006.01)

(52) U.S. Cl.
  CPC .............. *G05B 2219/24001* (2013.01); *G09G 2340/12* (2013.01); *G09G 2380/12* (2013.01)

(56) References Cited

U.S. PATENT DOCUMENTS

| | | | |
|---|---|---|---|
| 6,174,392 B1* | 1/2001 | Reis | B29C 73/06 156/58 |
| 6,738,532 B1 | 5/2004 | Oldroyd | |
| 7,208,057 B2* | 4/2007 | Weisser | B29C 65/52 156/286 |
| 7,743,660 B2 | 6/2010 | Marsh et al. | |
| 7,922,272 B2 | 4/2011 | Baird et al. | |
| 8,255,170 B2 | 8/2012 | Kollgaard et al. | |
| 8,825,498 B2 | 9/2014 | Kollgaard | |
| 9,254,622 B2* | 2/2016 | Flinn | B32B 3/263 |
| 2003/0069668 A1* | 4/2003 | Zurn | E01C 19/006 700/245 |
| 2006/0126902 A1* | 6/2006 | Matsuda | G01B 11/303 382/108 |
| 2008/0281554 A1* | 11/2008 | Cork | B29C 73/06 702/150 |
| 2008/0301152 A1 | 12/2008 | Kollgaard et al. | |
| 2010/0161095 A1* | 6/2010 | Lindgren | G06F 17/5095 700/98 |
| 2010/0274545 A1* | 10/2010 | Greenberg | G06F 17/5009 703/8 |
| 2010/0314029 A1* | 12/2010 | Lindgren | B23Q 17/20 156/98 |
| 2012/0327187 A1 | 12/2012 | Troy et al. | |
| 2013/0294644 A1* | 11/2013 | Cork | B29C 73/10 382/103 |
| 2014/0022281 A1* | 1/2014 | Georgeson | G06F 3/1454 345/633 |
| 2014/0141190 A1* | 5/2014 | Shigetomi | B29C 73/06 428/63 |
| 2014/0200731 A1* | 7/2014 | Evens | B29C 73/12 700/300 |
| 2015/0090392 A1 | 4/2015 | Bertrand et al. | |

OTHER PUBLICATIONS

Singapore Search Report and Written Opinion dated Oct. 23, 2018 in Singapore Patent Application No. 10201604084S (Singapore counterpart to the instant U.S. patent application).

* cited by examiner

REMOTE ADVANCED REPAIR GUIDANCE

BACKGROUND

This invention generally relates to systems and processes for repairing composite structures, and in particular, to systems and processes for effecting such repairs at a site with participation by an off-site repair expert.

The use of structures comprised of composite materials has grown in popularity, particularly in such applications as aircraft airframes, where benefits include increased strength and rigidity, reduced weight and reduced parts count. When damaged, however, composite structures often require extensive repair work which may ground an aircraft, thereby adding significantly to the support costs of the aircraft. Current maintenance procedures frequently require that the damaged component be removed and replaced before the aircraft can resume flying. Repairs to composite structures can be complicated and time consuming. Currently, many line mechanics do not generally have the training and experience to perform composite repairs.

The current process for repairing graphite/epoxy primary and secondary structures requires extensive preparation and multiple process steps to perform acceptable composite repairs. For example, a typical repair process involves scarfing the area around the defect, orienting and nesting a stack of repair plies made of composite material in the scarfed area, bagging the repair site, and subjecting the repair plies to vacuum and heating to consolidate and cure the composite material of the repair plies.

Often significant time is taken to perform the scarfing operations correctly because a technician is unfamiliar with the process. During manual scarfing, the technician usually relies on the visual shapes of the ply boundaries to determine how much composite material to scarf away. Errors may be introduced by the technician during scarfing or other operations (e.g., while orienting and nesting plies, during bagging or curing). For automated/robotic scarfing, errors may be introduced by the technician during set-up of the automated system. It would be advantageous to have an expert provide guidance and feedback during the entire repair process, yet it is costly to have a seasoned repair expert on site for each repair

SUMMARY

The subject matter disclosed in detail below comprises systems and processes for enabling an off-site expert to interact with an on-site technician during repair of composite structure. The off-site expert can provide real-time guidance to an on-site technician before and during the performance of repair procedures to avoid errors. The off-site expert is also able to monitor the repair procedures in real time to verify that correct procedures are being employed. In particular, the systems and processes disclosed herein can provide direct visual guidance, feedback, and out-of-plan warnings for manual or automated scarfing and other operations during repair of composite structure. In some embodiments, the repair process combines optical three-dimensional (3-D) surface measurement, illumination by at least one of visible, ultraviolet and infrared light, and digital light processing (DLP) projection to provide step-by-step monitoring of the repair by a remotely located repair expert.

The benefits of the systems and processes disclosed herein include, but are not limited to, the following: (1) a general reduction in errors during repair of composite structure, resulting in a faster repair with improved quality; (2) automatic visual documentation of the repair process for later review; and (3) the capability to provide process control for repair of composite structure.

One aspect of the subject matter disclosed in detail below is a process for preparing a composite structure, comprising: (a) projecting a first image onto a surface of a composite structure, wherein the first image indicates an area where composite material should be removed; (b) adjusting a location and a size of the projected image so that the first image overlies and is registered with a first area on the surface; and (c) removing composite material in the first area. This process may further comprise: retrieving the first image from an image database or constructing the first image based on information about the composite structure retrieved from a database using a first computer system at a remote location; sending the first image from the first computer system to a second computer system located in proximity to the composite structure via a network; and sending the first image from the second computer system to a projector which is aimed at the composite structure. The first image further indicates respective regions in the area where material should be removed to respective depths which are different. The regions indicated in the first image have outlines corresponding to respective plies of different sizes. In accordance with some embodiments, the removing operation comprises sanding to a maximum depth that removes a defect in the first area and sanding composite material to form a taper that extends from the maximum depth to a second area on the surface that surrounds the first area. (As used herein, the term "taper" refers to a line that is not perfectly straight. For example, a taper may deviate from straight due to waviness.) This process may further comprise projecting a second image onto a second area of the surface, wherein the second image comprises a specification of instructions for a procedure for removing composite material from the first area of the surface.

Another aspect of the subject matter disclosed in detail below is a process for preparing a composite structure, comprising: (a) projecting a first image onto a surface of a composite structure, wherein the first image indicates an area where composite material should be removed; (b) adjusting a location and a size of the projected image so that the first image overlies and is registered with a first area on the surface; (c) removing composite material in the first area; (d) measuring a baseline three-dimensional profile of the first area of the surface before any composite material is removed in operation (c); (e) measuring an updated three-dimensional profile of the first area of the surface after composite material has been removed in operation (c); and (f) determining depths in respective regions of the first area following operation (c) based on differences between the baseline and updated three-dimensional profiles. This process may further comprise: (g) identifying a region of the first area where additional composite material should be removed based in part on the depths determined in operation (f); and (h) projecting a second image onto the first area of the surface, wherein the second image indicates the region identified in operation (g).

A further aspect is a process for laying up plies of composite material in a depression in a composite structure at a repair site, comprising: (a) projecting a first image onto a surface of a composite structure having a depression, wherein the first image comprises a first plurality of outlines of different sizes and an indication of orientation for a smallest one of the outlines of the first plurality; (b) adjusting a location and a size of the projected first image so that the first image overlies and is registered with the depression;

and (c) placing a first ply of composite material in the depression at a location of the projected first image of the smallest one of the outlines of the first plurality with an orientation such that fibers of the first ply of composite material are parallel to the indication of orientation for the smallest one of the outlines of the first plurality. This process may further comprise: retrieving the first image from an image database or constructing the first image based on information about the composite structure retrieved from a database using a first computer system at a remote location; sending the first image from the first computer system to a second computer system located at the repair site via a network; and sending the first image from the second computer system to a projector which is aimed at the composite structure. In addition or in the alternative, the process may further comprise: (d) illuminating the depression on the surface of the composite structure; (e) capturing a camera image of the illuminated depression using a camera having a field-of-view that encompasses the depression; (f) sending the camera image to a computer system at a remote location; (g) verifying cleanliness and roughness of a surface of the depression based on the camera image received at the remote location; and (h) sending an approval from the remote location to the repair site to start a repair procedure when the cleanliness and roughness of the surface of the depression have been verified, wherein operations (d) through (h) are performed before operations (a) through (c).

Yet another aspect is a process for forming a depression in a composite structure, comprising at a repair site, comprising: (a) removing composite material in an area of a surface of a composite structure; (b) measuring a three-dimensional profile of the area after composite material has been removed; (c) determining current depths in respective regions of the area where composite material has been removed; (d) identifying regions in which the respective current depth is less than a respective target depth; (e) generating an image that indicates the regions identified in operation (d); (f) projecting the image onto the surface of the composite structure; (g) adjusting a location and a size of the projected image so that the regions identified in operation (d) overlie and are registered with respective regions of the area on the surface; and (h) removing additional composite material from the respective regions in the area of the surface of a composite structure on which the regions identified in operation (d) were projected in operation (g), wherein operations (a), (b), (g), and (h) are preformed at the repair site and operation (c) through (e) are performed at a remote location. Operations (b) through (h) can be iterated until no regions are identified in operation (d).

A further aspect of the subject matter disclosed in detail below is a system for providing repair guidance to a repair site from a remote location, comprising: a composite structure comprising a portion containing a defect and situated at a repair site; a first computer system located at the repair site; a second computer system at a remote location; a network by which the first and second computer systems are able to communicate; and a projector directed at the portion of the composite structure containing the defect, the projector being able to receive images from the first computer system, wherein imaging data representing an image that includes indications where composite material should be removed from the portion of the composite structure containing the defect is concurrently stored in the projector and the first and second computer systems.

Other aspects of systems and processes for remote advanced repair guidance are disclosed below.

BRIEF DESCRIPTION OF THE DRAWINGS

Reference will hereinafter be made to the drawings in which similar elements in different drawings bear the same reference numerals.

DETAILED DESCRIPTION

Modern mechanical systems such as aircraft have extensive maintenance requirements and data records. Current maintenance data systems allow technicians to retrieve technical manuals and other maintenance information for a system type being worked on in portable computer or handheld devices for ease of access to necessary information. Many systems additionally include recorded maintenance information specific to the exact system being examined. This allows technicians immediate access to necessary information without having to leave the work area to view manuals, data records or computer terminals with the desired information.

The cost-effective inspection, repair and monitoring of repairs on composite aircraft requires precise locating and sizing of these repairs and access to their corresponding nondestructive evaluation (NDE) data. Current repair designs are dependent upon the location and size of previous repairs, which may not be obvious in external observations, such as a scarfed composite repair. Accordingly, it is known to provide a maintenance history solution that combines maintenance history visualization (damage, repair, NDE, etc.), on-aircraft location, and mobile devices, for user-friendly real-time and remote-expert maintenance tracking. In some cases, the solution implemented is self-registering using optical detection of temporary or permanent reference points.

It is known to provide an optical reference system for Augmented Reality (AR)-enabled mobile maintenance tracking that can be built, deployed temporarily and periodically, and maintained easily in the computer memory of portable devices. Augmented Reality allows the projection of computer-generated elements overlaid on real-world objects to provide the viewer with an enhanced visualization of both real-world elements and computer-generated elements. It enables mobile non-destructive evaluation (NDE) or maintenance data to be displayed all around a structure such as an aircraft. Alternative databases with additional information regarding the aircraft can also be accessed and information projected onto the aircraft using a projector registered to the aircraft coordinate system.

Figure 1:
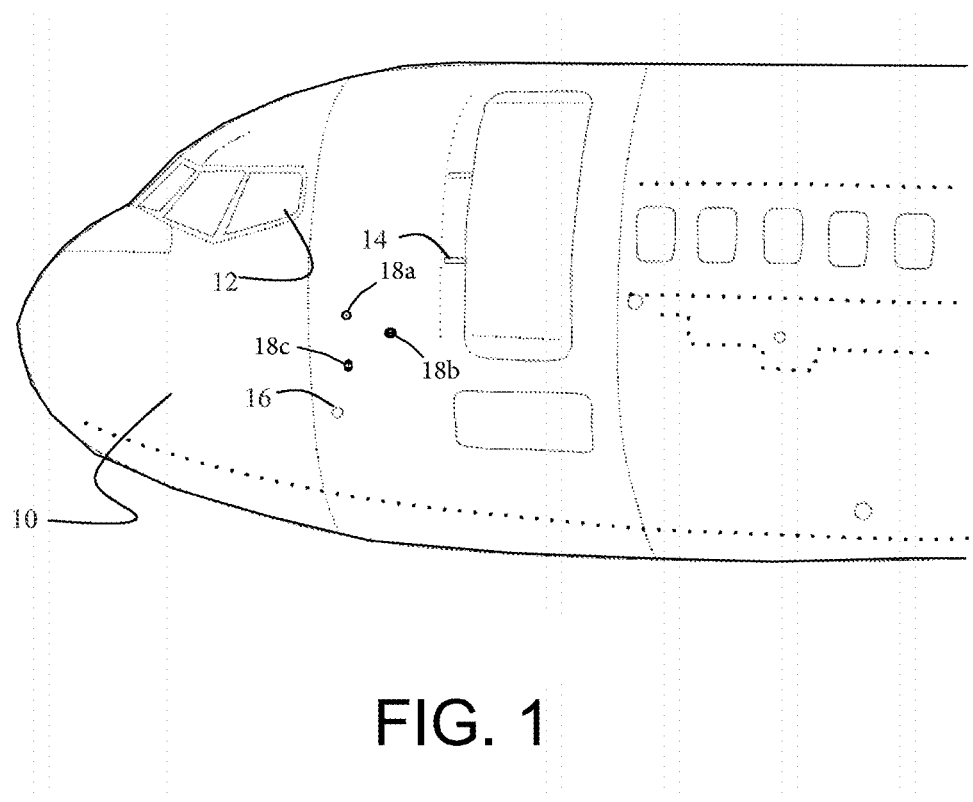
FIG. 1 is a diagram representing a two-dimensional view of portion of a virtual fuselage constructed using a detailed Computer Aided Design (CAD) database containing a three-dimensional model of a fuselage in which items are located with reference to a common Cartesian coordinate system.

FIG. 1 is a diagram representing a two-dimensional view of portion of a virtual fuselage 10 constructed using a detailed Computer Aided Design (CAD) database containing a three-dimensional (3-D) model of the fuselage in which items are located with reference to a common Cartesian coordinate system. That coordinate system may then be applied as a reference coordinate system for determining the absolute location of any element of the structure contained in the CAD database. This CAD database is then maintained and available for reference in evaluations of ongoing inspection and maintenance of the aircraft. The CAD database provides a coordinate system and exact geometrical information interrelated to that coordinate system associated with the entire structure and all components contained therein. As maintenance is performed, information regarding repairs or other maintenance procedures is stored with respect to this reference coordinate system in a maintenance and/or NDE database which is also keyed to the reference coordinate system. While a CAD database is employed in the embodiments disclosed herein, any system which establishes a reference for absolute position to a common coordinate system may be employed.

When viewed from the exterior as depicted in FIG. 1, the virtual fuselage 10 has numerous features which may be correlated to the same features in the CAD database. This one-to-one mapping between the physical positions of features on the real object and the Cartesian coordinates from measurements of the virtual model enables image data from a maintenance and/or NDE database to be precisely projected onto a specific surface area where the structure represented by the image data is located. Features such as a window corner 12, a door hinge 14 or a pitot static port 16 present in the CAD database with known absolute dimensions in a 3-D representation and data from the maintenance database may be similarly identified in the 3-D representation.

Using the information from the CAD database, at least three fiducial markers (i.e., optical targets) can be attached to the surface of a real fuselage at known locations around an area that requires repair by a technician. For example, a fiducial marker could be located at certain distances from a pair of structural features having known coordinates in the frame of reference of the fuselage. Virtual fiducial markers 18a, 18b and 18c are shown in FIG. 1 at respective known locations as they would appear in an image of the virtual fuselage stored in the CAD database. Three fiducial markers attached to an actual fuselage under repair can be used to register a projected image of the repair area onto the surface of the fuselage. The absolute position (in the fuselage coordinate system) of the fiducial markers attached to an actual fuselage can be verified using a local positioning system of the type disclosed in U.S. Pat. No. 7,859,655. The local positioning system has a laser range finder and associated camera which can be used to measure the actual distances between each fiducial marker and the camera, which enables a determination of the correct 3-D location of the set of three fiducial markers within the fuselage coordinate system.

As will be described in more detail below with reference to FIG. 3, when the fiducial markers are attached at their correct positions on a fuselage under repair, an image may be registered with the three fiducial markers and projected onto a surface of the fuselage in a region of projection (not shown in FIG. 1), which image includes information from one or more databases. For example, the projector may project information regarding maintenance repairs from the maintenance database, NDE information from the NDE database or structural information regarding the aircraft from the CAD database. Any desired information from the CAD database or the associated maintenance database may be transmitted to and displayed by the projector onto a region of projection on the fuselage 10. For example, information regarding a repair may be projected showing the location and extent of the repair and a data block regarding the maintenance performed. Information about features of the fuselage from the CAD database such as window corner 12, door hinge 14 or pitot static port 16 or features hidden below the skin such as stringers or other structural members or components may also be displayed as part of the projected image if desired.

The foregoing capability to project repair information onto a structure made of composite material can be employed in aid of a process for providing expert guidance from a remote location to a technician at the repair site. The systems and processes disclosed in detail below enable an off-site expert to interact with an on-site technician during a repair procedure involving scarfing, ply lay-up, consolidation and curing are described below. The off-site expert can provide real-time guidance to an on-site technician before and during the performance of the repair procedures to avoid errors. The off-site expert is also able to monitor the repair procedures in real time to verify that correct procedures are being employed. Before describing the remote advanced repair guidance set-up and process in detail, one example of a procedure for repairing composite material will now be described.

It is known to provide a repair method and system that uses scarfing, ply lay-up, and double vacuum debulking (DVD) to repair a composite structure. Scarfing is performed in order to remove defects and to prepare a surface for the repair plies. The sanding is done either manually or mechanically using various grits of sandpaper, and diamond or carbide grit cutting wheels. The technician sands in a circular, oblong, oval, or semicircular pattern based on the defect configuration and location. In accordance with one set of specifications, the composite material should be scarfed at a nominal slope of a 30 to 1 ratio (the ratio of the taper length to depth) with an allowable range between 28 to 1 and 32 to 1. The following formulas are used to help make the scarf area the proper size:

$$\text{Taper Length} = (\text{Ply Thickness}) \times (\text{Number of Plies}) \times (\text{Slope Ratio})$$

$$\text{Exposed Width per Ply} = (\text{Ply Thickness}) \times (\text{Slope Ratio})$$

Figure 5:
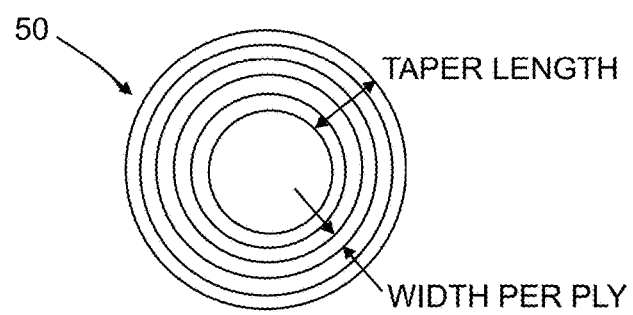
FIG. 5 is a diagram showing taper length and width per ply dimensions for a tapered depression produced by scarfing composite material.

These dimensions are indicated in FIG. 5, which shows a scarfing map 50 comprising rings indicating the respective increasing diameters of a stack of circular plies. For a particular composite material, the maintenance database will include nominal ply thicknesses for tape and for fabric. These ply thicknesses are designed to produce respective specified scarfed ply widths. If the above nominal ply thicknesses are not satisfactory for an individual repair situation, the repair expert can specify an appropriate ply thickness to be used. In the aforementioned specifications, the actual requirement is to have a total scarf width of 28 to 32 times the scarf depth, and a visual appearance on the scarf surface of approximately equal ply widths. The scarfed areas should have a smooth transition from ply to ply with minimum waviness. The actual taper line will not be perfectly straight. The technician can lay a straight edge along the taper line and measure the deviation of the actual taper line from a straight line due to waviness. The scarfing specifications typically include a maximum deviation from straight.

As used herein, the term "double vacuum debulking" means a process in which a stack of repair plies is subjected to vacuum and mild heating without being compacted by atmospheric pressure. The purpose of the double vacuum debulk process is to minimize porosity in the repair plies by drawing air and other gases from between the plies while they are in an uncompacted state. One known process flow for a DVD repair comprises the following steps:

(1) remove paint and primer from the defective area, plus at least 2 inches on all sides, using fine abrasive;

(2) within 2 inches outside the defective area, use fine abrasive to remove paint and surface resin only;

(3) scarf (i.e., sand) the area around the defect to a depth sufficient to clean out the defective material and to prepare a surface for the repair plies;

(4) determine the size, shape and orientation of composite repair plies, make ply templates, and kit plies (the largest repair ply should overlap at least 0.25 inch beyond the periphery of the scarf);

(5) cut and perforate one ply of adhesive, e.g., epoxy-based film adhesive MB-1515 (adhesive should extend over the entire scarf area and 0.25 inch beyond the largest repair ply; the perforations will allow trapped air to escape during initial vacuum compaction);

(6) solvent clean the scarfed and sanded surfaces;

(7) apply the perforated adhesive ply to the repair area;

(8) place a polyester scrim, a perforated parting film (made, e.g., of fluorinated ethylene propylene (FEP)) and then a ply of breather material (e.g., fiberglass fabric or a polyester mat such as Airweave Super N10 commercially available from Airtech International, Carson Calif.) in sequence over the adhesive ply;

(9) use a temporary vacuum bag (placed over the breather material and sealed to the parent structure along a perimeter surrounding the adhesive) to compact the adhesive under a pressure of 1 atm for a minimum of 10 minutes;

(10) remove the parting film, breather material and temporary vacuum bag (the polyester scrim is not removed and becomes part of the repair);

(11) place the stack of repair plies over the compacted adhesive layer, locating and orienting plies correctly (i.e., in accordance with design specifications) with regard to fiber direction and location tolerance;

(12) place a polyester scrim, a perforated parting film (e.g., FEP film) and then a ply of breather material (as previously described) in sequence over the repair plies;

(13) use a temporary vacuum bag (placed over the breather material and sealed to the parent structure along a perimeter surrounding the repair plies) to compact the plies under a pressure of 1 atm;

(14) remove the breather material and temporary vacuum bag (the polyester scrim is not removed and becomes part of the repair, while the parting film can be reused as part of a DVD lower bag assembly);

(15) prepare the DVD lower bag assembly, which includes the following steps: lay a perforated parting film 31 (made, e.g., from FEP) over and extending beyond the repair plies; lay a ply of bleeder material over and extending beyond the perforated parting film 31; lay an unperforated parting film over the bleeder ply; place an electric heat blanket on top of the thus-formed stack, with the repair plies separated from the heat blanket by the intervening bleeder ply and separating films; cover the heat blanket with breather plies; place a lower bagging film over the other layers of the lower bag assembly and seal it to the composite structure using sealing tape; and place four thermocouples around the perimeter of the repair plies to measure temperature;

(16) install two vacuum probes in respective apertures in the lower bagging film, coupling one vacuum probe to a vacuum source and coupling the other vacuum probe to a vacuum gauge, which will be used measure the pressure inside the chamber defined by and disposed underneath the lower bagging film;

(17) prepare a DVD upper bag assembly, which includes the following steps: place strongback support tooling supported along its perimeter by a solid silicone standoff or spacer to form a box that covers the lower bagging film; and place an upper bagging film made, e.g., of nylon, over the box, sealing it to the composite structure using sealing tape 20;

(18) connect a vacuum gauge to one vacuum probe and a vacuum source to another vacuum probe of the DVD upper bag assembly;

(19) apply a vacuum to both the upper and lower bags, the vacuum on the lower bag being ≥26 inHg and the vacuum on the upper bag being equal to the vacuum on the lower bag +0/−1 inHg;

(20) heat the heat blanket to a soak temperature of 220°±10° F. at a ramp rate of 3°±1° F./min and then subject the part to the soak temperature for a dwell time of 30 (±5) minutes;

(21) vent the upper bag when the dwell time has expired while maintaining the soak temperature for another 30 (+5/−0) minutes;

(22) for a patch having 35 plies or less, heat the heat blanket from the soak temperature at a ramp rate of 1° to 3° F./min up to a final cure temperature of 350°±15° F., while maintaining the vacuum on the lower bag at ≥26 inHg, and then hold at that temperature and pressure for 150-180 minutes to achieve full cure;

(23) allow the repair site to cool at a rate no greater than 5° F./min;

(24) remove the DVD upper and lower bag assemblies; and

(25) perform surface finishing as necessary.

The foregoing process for repairing graphite/epoxy primary and secondary structures requires extensive preparation and multiple process steps to perform acceptable composite repairs. The steps required for processing successful composite repairs are very time consuming and labor intensive. Accordingly, mistakes can be reduced and/or eliminated by providing expert guidance to the on-site technician assigned to carry out this rather complicated repair process.

In accordance with one embodiment of a remote advanced repair guidance process, a laser profilometer (or similar 3-D optical metrology tool) collects a baseline surface measurement (from a model, or from the surface, or a combination thereof) before the repair procedure is started. The profilometer may be any instrument configured to measure a profile of an object. Then a scarfing guide, provided by a remotely located repair expert, is projected onto the surface of the fuselage. The scarfing guide comprises a map that uses colors and shapes to indicate what the area to be scarfed should look like after scarfing has been completed. The projected scarfing guide may also include pictures with procedural steps and hints to help the technician scarf the repair area. During the scarfing procedure, the technician will be instructed periodically to use the profilometer to measure the partially scarfed area, which measurements can be compared by the repair expert at the remote location to the baseline measurements to determine the scarfing depth in the scarfed regions. The remote expert can compare the current scarfing depths to the target scarfing depths for the repair plan adopted by the remote expert. As a result of this comparison, the remote expert can identify any region which is under- or over-scarfed and then send an updated scarfing map containing visual cues indicating regions where scarfing is not deep enough, at the correct depth, or too deep. When scarfing has been completed, the technician is guided through cleaning and roughening the scarfed surface. The scarfed area can be illuminated with light of various wavelengths (e.g., ultraviolet, infrared and visible) to fluoresce the surface and verify that cleaning and surface preparation are within applicable specifications. In addition, laying down of adhesive and plies is guided by projected images including various colors and indications of ply directions projected onto the scarfed area and instructions projected next to (i.e., outside) the scarfed area.

Figure 2:
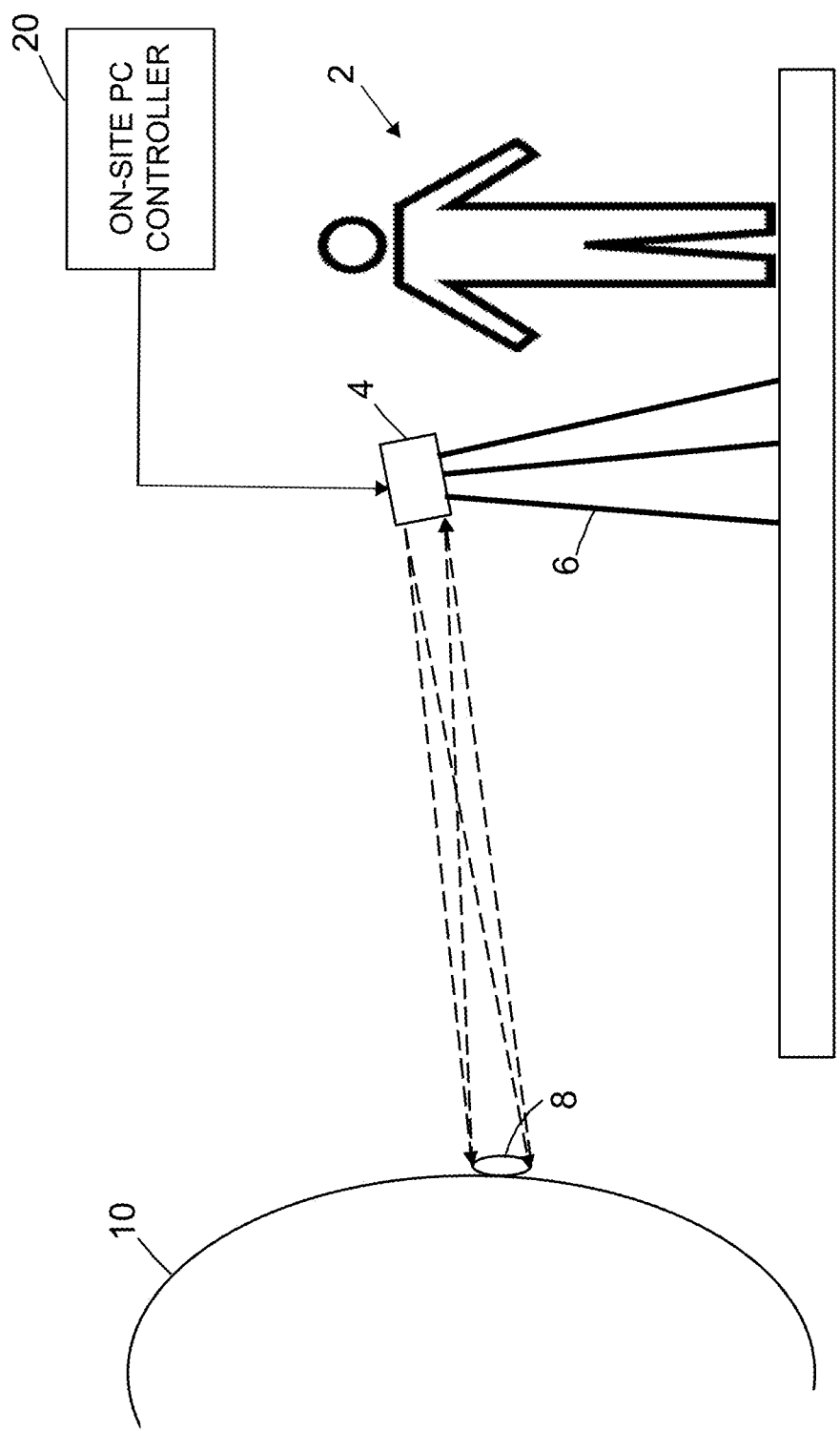
FIG. 2 is a diagram representing a set-up at a repair site where a technician can use a profilometer to optically measure the 3-D coordinates of a surface area on a fuselage in which a defect is located.

FIG. 2 is a diagram representing a set-up at a repair site where a technician 2 can use a profilometer 4 (mounted on a tripod 6) to optically measure the 3-D coordinates of a surface area 8 on a fuselage 10 in which a defect is located. The profilometer 4 may be controlled using an on-site PC controller 20 having a user interface. As explained below, the on-site PC controller 20 can communicate with a remote workstation via a network. In particular, the surface measurement data output by the profilometer 4 can be sent by the on-site PC controller 20 to a remote workstation (not shown in FIG. 2).

In one implementation, the profilometer 4 may take the form of a photogrammetric tool (e.g., a TRITOP$^{CMM}$ system commercially available from Gesellschaft fur Optische Messtechnik could be employed). A profilometer 4 of this type has the ability to acquire point cloud scan data representing the scanned surface in 3-D coordinates. In addition, the profilometer 4 collects a very dense set of mesh data. From this mesh data, a computer system can extrapolate large quantities of points which define the actual surface location and provide an accurate representation of the actual surfaces being measured. Commercially available 3-D scanners can have point densities as high 16 million points per square foot. The use of such a high-density profilometer enables better capture of the surface definition. The profilometer 4 produces dense point clouds that capture precisely the full surface geometry of the surface area 8 on the fuselage 10.

Figure 3:
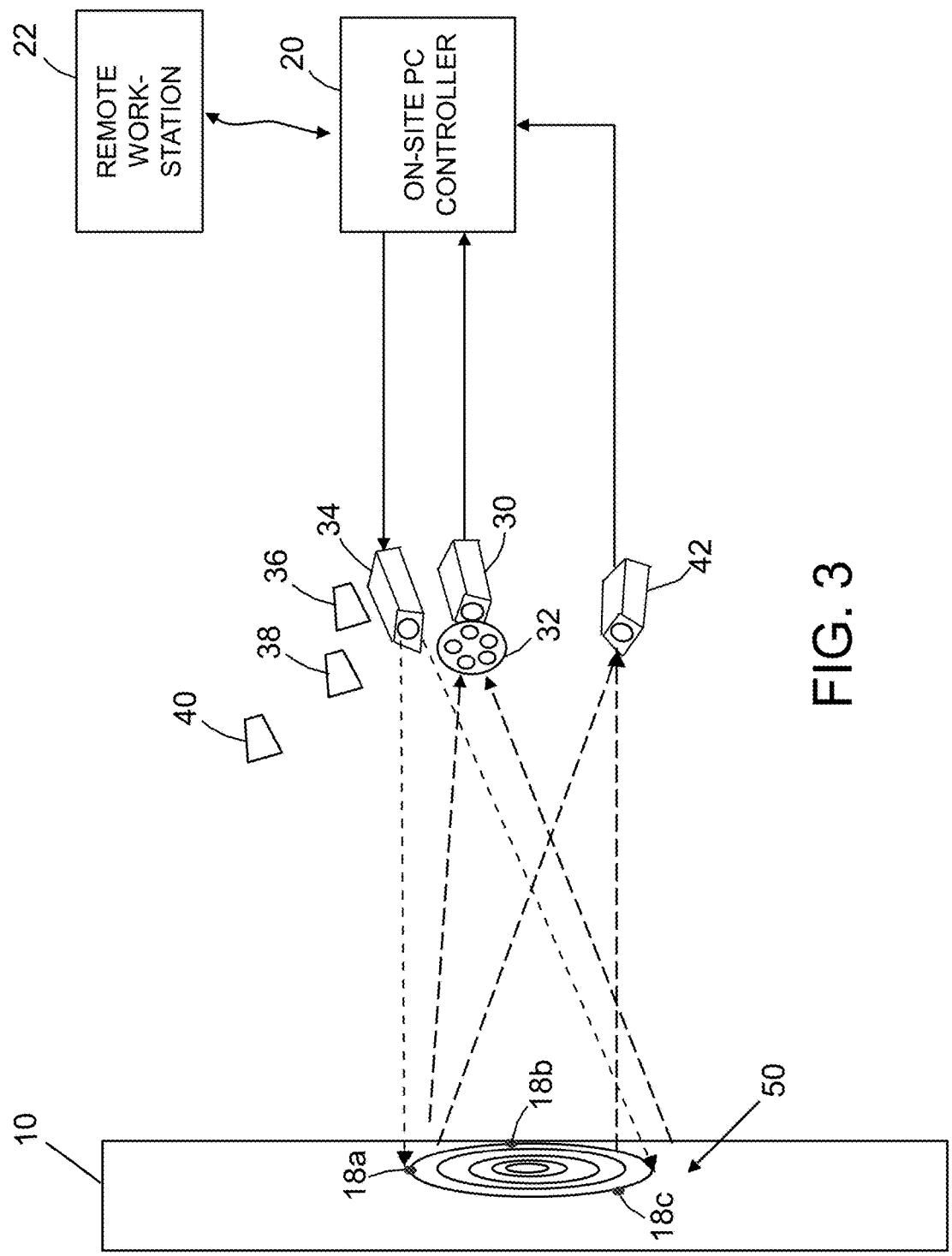
FIG. 3 is a diagram identifying components of a system for providing guidance from a repair expert at a remote location to a technician at a repair site.

FIG. 3 is a diagram identifying additional components of a system for providing guidance from a repair expert at a remote location to a technician at a repair site. The profilometer previously discussed with reference to FIG. 2 is not shown in FIG. 3 to avoid clutter in the drawing. The equipment available for use by the technician at the repair site further includes a video camera 30 having a color filter wheel 32 disposed in front of the camera lens, a digital light processing (DLP) projector 34, an infrared illuminator 36, an ultraviolet illuminator 38, a source of visible light 40, and a thermogram radiometer 42. The angular position of the color filter wheel 32 is selectable to provide the best image quality possible.

FIG. 3 depicts a scenario where the DLP projector 34 is projecting a scarfing map 50 onto a surface of the fuselage 10 (the outer boundary of the projection is indicated by a pair of dashed arrows pointing at the surface of fuselage 10). The field of view of the video camera 30 (indicated by dashed arrows pointing toward the camera) preferably encompasses at least the area on which the scarfing map 50 is being projected.

When the source of visible light 40 or the ultraviolet illuminator 38 is activated to illuminate the repair area, the video camera 30 captures images having a spectrum dependent on the angular position of the color filter wheel 32. The image data acquired by the video camera 30 is sent to the on-site PC controller 20. When the infrared illuminator 36 is activated to illuminate the repair area, the thermogram radiometer 42 can be used to detect infrared light radiating from the surface in the illuminated area. The infrared image data acquired by the thermogram radiometer 42 is also sent to the on-site PC controller 20. The image data captured by the video camera 30 and the thermogram radiometer 42 are output to the on-site PC controller 20. The on-site PC controller 20 in turn communicates the recorded image data to the remote workstation 22 via a network (not shown in FIG. 3), allowing the remote repair expert to observe the repair process, provide guidance to be projected by the DLP projector 34, and provide process feedback and analysis.

Figure 4:
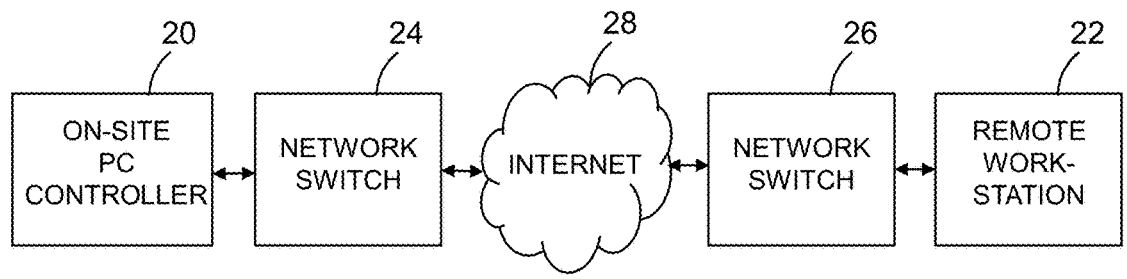
FIG. 4 is a block diagram identifying components of a network for enabling one computer located at a repair site to communicate with another computer at a remote location.

As depicted in FIG. 4, the on-site PC controller 20 may communicate with the remote workstation 22 via a first network switch 24, the Internet 28, and a second network 26. The remote workstation 22 (to be operated by a repair expert) is located at an operations command center (referred to herein as the "remote site") and comprises a master display. For conducting a repair operation, some of the initial tasks performed by the technician at the repair site include: setting up the equipment depicted in FIGS. 2 and 3; and connecting the on-site PC controller 20 to the Internet 28 by way of the network switch 24. The Internet connection of the on-site PC controller 20 may be wired or wireless. After setup, the video camera 30 and DLP projector 34 allow a repair expert at the remote location to help guide the rest of the process, as will be described in greater detail hereinafter. Once the on-site PC controller 20 is started, an automated process will send the on-site network domain information back to the operations center via network switches 24 and 26 and the Internet 28.

Referring back to FIG. 3, scarfing and repair guidance can be communicated from the remote workstation 22 to the on-site technician by way of the on-site PC controller 20 and the DLP projector 34. In particular, the DLP projector 34 can receive image data from the remote workstation 22 via the on-site PC controller 20. The DLP projector 34 projects that image data over the area to be repaired. As seen in FIG. 3, the projected image data comprises a scarfing map 50, projected onto the area to be scarfed, indicating what the scarfed area should look like when scarfing has been completed. The region of projection on the surface of the fuselage 10 can be adjusted to ensure that the projected scarfing map is registered with and sized to fit the actual area to be scarfed. In cases where the projector is not set up with its line of projection normal to the surface, a simple correction of the projected image can be made based on the angle of deviation from normal. (If the position and orientation of the projector relative to the camera are known, than the angle of the line of projection relative to the surface can be determined from the camera pose relative to the surface, which in turn may be measured in a well-known manner.) The projected image data may further comprise pictures and written instructions for the technician to follow as needed, which pictures and instruction are projected onto a surface area outside but near the scarfed area.

The size and location of the region of projection on the surface of the fuselage 10 can be adjusted using at least three fiducial markers attached to the fuselage surface at respective known locations. In the example depicted in FIG. 3, three fiducial markers 18a-18c are shown attached to the surface of the fuselage 10 at respective locations around the outer circumference of the scarfing map 50 (assuming for the sake of illustration that the area to be scarfed is circular, which is not always the case). The fiducial markers 18a-18c may be attached at known locations by the on-site technician, before the baseline surface measurements are made, based on instructions (e.g., location coordinates in the frame of reference of the fuselage coordinate system) received from the off-site expert.

In addition, the projected image data may include spots indicating the relative locations of the imaged fiducial markers in the projected image. These spots can be inserted into the scarfing map by the remote expert based on the known locations of the fiducial markers 18a-18c and the known location of the area to be scarfed in the fuselage coordinate system. Preferably, the DLP projector 34 is mounted on a platform whose angular positions with respect to three mutually orthogonal axes can be manually adjusted. In addition, the size of the region of projection of the DLP projector 34 can be adjusted. By adjusting line-of-sight and size of the region of projection, the technician align the spots (i.e., virtual fiducial markers) in the projected image with the fiducial markers 18a-18c attached to the fuselage 10.

The size, shape and location of the area to be scarfed may be dictated by specifications in a repair plan selected by the remote expert from a multiplicity of repair plans pre-stored in the maintenance database. The imaging data to be projected onto the scarfing area may be part of the pre-stored repair plan. The virtual fiducial markers may be included in the retrieved imaging data or added by the remote expert. In the alternative, the repair plan may be customized by the remote expert to take into account the location and size of the defect and structural conditions (including past repairs) in the area of the defect.

After the technician has removed paint and primer from the defective area on the fuselage 10, a scarfing guide can be projected onto the fuselage surface. The technician is now ready to being the scarfing operation. As previously mentioned, the area around the defect should be scarfed (i.e., sanded) to a depth sufficient to clean out the defective material and to prepare the surface for the repair plies.

Figure 6A:
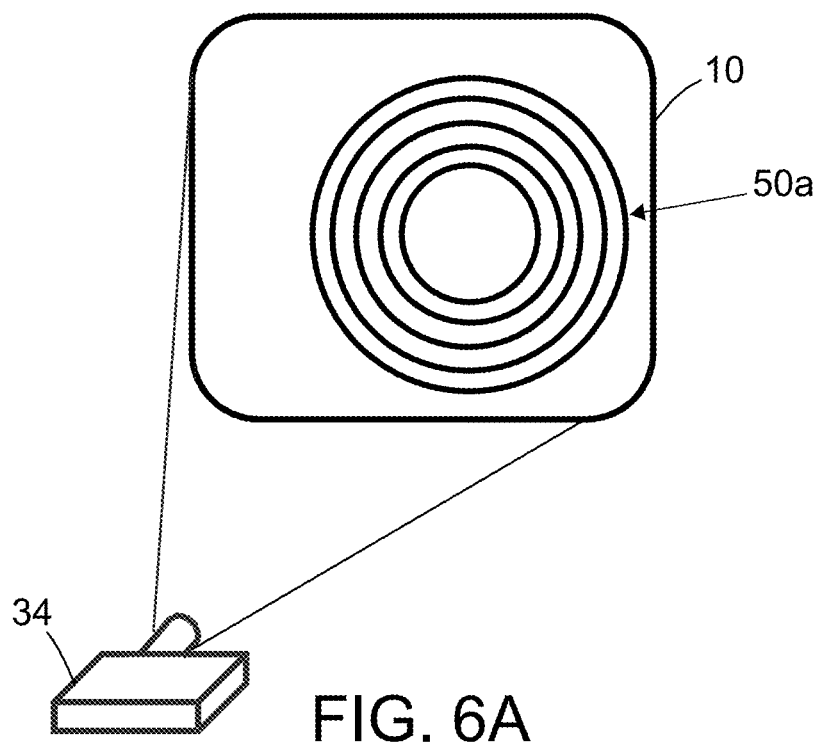
FIGS. 6A through 6D are diagrams representing respective scarfing maps projected on a repair area on the surface of a fuselage at various stages during a scarfing process.

FIGS. 6A through 6D are diagrams representing respective scarfing maps projected on a repair area on the surface of a fuselage 10 at various stages during a scarfing process. As seen in FIG. 6A, the image data projected by the DLP projector 34 comprises a circular scarfing map 50a that includes colors and shapes to indicate what the area to be scarfed should look like after scarfing has been completed. The technician can begin to remove composite material either manually or mechanically.

Scarfing produces profile changes to the surface that can be measured by the profilometer 4 (see FIG. 2). During the scarfing procedure, the technician will be instructed periodically to use the profilometer 4 to measure the partially scarfed area, which measurements can be compared by the repair expert at the remote location to baseline measurements to determine the actual current scarfing depth in the scarfed regions. The remote expert can compare the current scarfing depths to the target scarfing depths for the particular repair plan being implemented. As a result of this comparison, the remote expert can identify any region which is under- or over-scarfed and then send an updated scarfing map containing visual cues indicating regions where scarfing is not deep enough, at the correct depth, or too deep. Changes in the surface due to scarfing are projected back onto the repair area as color changes, showing visually the scarf depth. The technician uses the projected color changes as a guide to where to remove additional composite material.

Figure 6B:
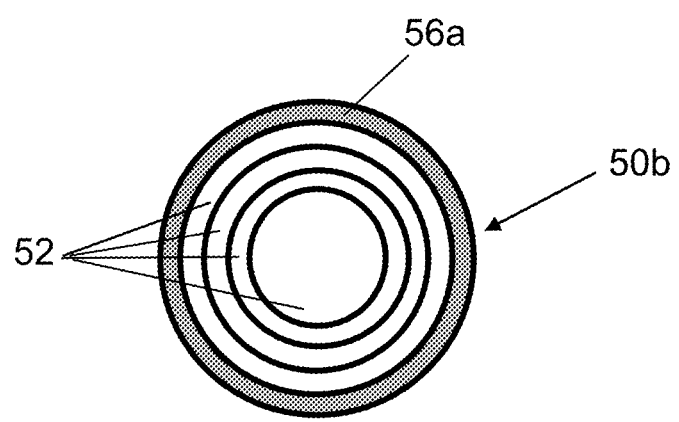
Figure 6C:
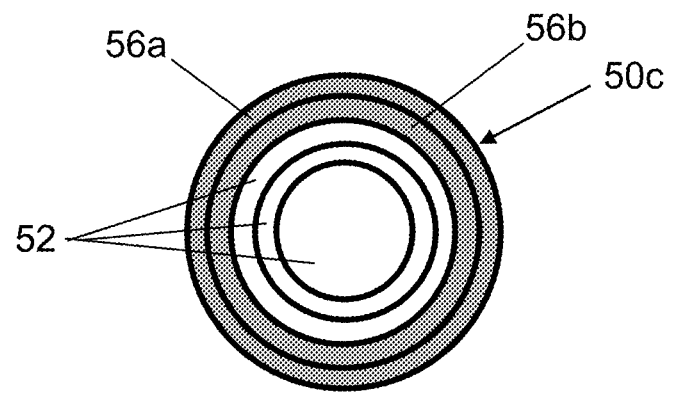
Figure 6D:
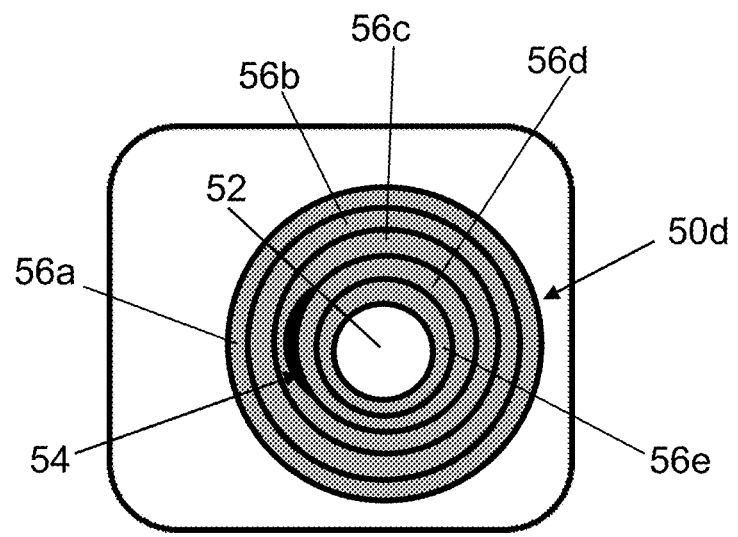

FIG. 6B shows a scarfing map 50b that might be generated by the remote expert and projected onto the area being and to be scarfed (hereinafter "scarfing area") following scarfing of only an outermost annular region 56a of the scarfing area, measurement of the surface of the scarfing area, uploading of the surface measurement data to the remote expert, and assessment by the remote expert of the current state of scarfing. In actual practice, the projected scarfing map 50b will be color-coded to indicate the state of scarfing in respective regions. In FIGS. 6B through 6D, color coding is indicated by grayscale shading. In FIG. 6B, only the outermost annular region 56a is lightly shaded to indicate that scarfing in the outermost annular region 56a is done, while the remaining regions 52 require more scarfing.

FIG. 6C shows a scarfing map 50c that might be generated by the remote expert and projected onto the scarfing area following additional scarfing in the next annular region 56b of the scarfing area, measurement of the surface of the scarfing area, uploading of the surface measurement data to the remote expert, and assessment by the remote expert of the current state of scarfing. In FIG. 6C, the two outermost annular regions 56a and 56b are lightly shaded to indicate that scarfing in the outermost annular regions 56a and 56b is done, while the remaining regions 52 have no shading to indicate that more scarfing is needed in those regions.

FIG. 6D shows a scarfing map 50d that might be generated by the remote expert and projected onto the scarfing area following additional scarfing in annular regions 56c and 56d and in a region 56e (which is a portion of the central area where the specified scarfing depth is a maximum), measurement of the surface of the scarfing area, uploading of the surface measurement data to the remote expert, and assessment by the remote expert of the current state of scarfing. In FIG. 6D, the regions 56a through 56e are lightly shaded to indicate that scarfing in those regions is done, while the remaining region 52 has no shading to indicate that more scarfing is needed. In addition, a crescent-shaped portion 54 of the annular region 56c is darkly shaded to indicate that too much composite material has been removed in that region (i.e., a condition of over-scarfing is present).

A specific color can be used for when the technician is getting close to a completed scarf, and another color can be used for when the technician is done. And, a third color can be used to warn that an over-scarf condition is occurring. The technician can use the projected color changes as a guide to where to remove additional composite material.

Once the scarf has been completed, the on-site technician or off-site expert selects the start of the next projection series, which guides them through surface preparation, adhesive application, ply-by-ply sizing and lay-up, and even bagging and curing processes.

First, the technician receives instructions during cleaning and roughening the scarfed surface. Surface preparation processes vary, but should be done with guidance by the remote expert or projected information.

After the surface of the scarfed area has been properly prepared, the scarfed area can be illuminated with light of various wavelengths (e.g., ultraviolet, infrared and visible) to fluoresce the surface and verify that cleaning and surface preparation are within applicable specifications. In particular, ultraviolet, infrared and visible illumination of the prepared surface can be used to check the surface for foreign object debris, remaining damage, and contamination.

Once the surface cleanliness and roughness have been verified visually (by the on-site technician or off-site expert), the adhesive is applied, per directions (projected directions or instructions from the off-site expert). In addition, laying down of adhesive and plies of composite material is guided by projected images including various colors and indications of ply directions projected onto the scarfed area and instructions projected next to (i.e., outside) the scarfed area. The position and orientation of each ply (determined beforehand by the repair design) can be projected onto the scarfed area (now covered by a ply of adhesive material). Each ply application can be verified locally or remotely.

FIGS. 7A through 7E are diagrams representing images of respective plies of composite material of different sizes and orientations which can be projected in sequence onto the scarfed area on the surface of the fuselage 10 during the ply lay-up operation. These images will be referred to hereinafter as "ply lay-up maps".

Figure 7A:
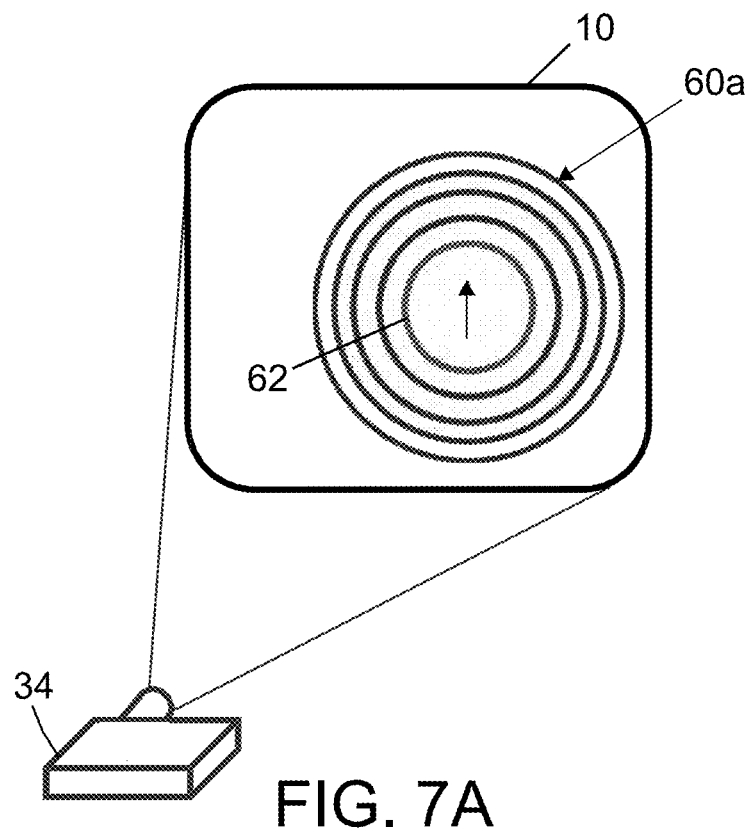
FIGS. 7A through 7E are diagrams representing images of respective plies of composite material of different sizes and orientations which can be projected in sequence onto the scarfed area during the ply lay-up operation.

After the ply of adhesive has been placed on the repair area and compacted in accordance with applicable specifications, the first (and smallest) ply of composite material is placed over the compacted adhesive layer. FIG. 7A shows a ply lay-up map 60*a* which can be projected onto the repair area. The ply lay-up map 60*a* includes a circle 62 representing the first ply of composite material with fibers oriented at a 0° angle, as indicated by the vertical arrow.

Figure 7B:
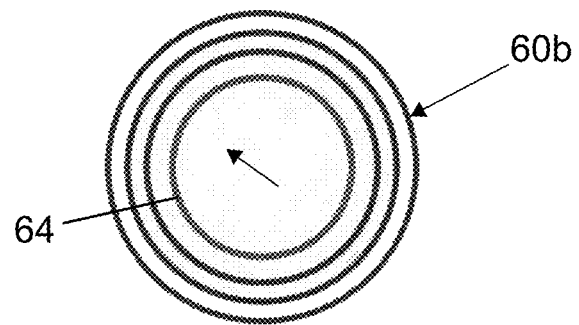

After the first ply of composite material is in place, a second (next larger) ply of composite material (of greater diameter) is placed over the first ply. FIG. 7B shows a ply lay-up map 60*b* which can be projected onto the repair area to guide the technician. The ply lay-up map 60*b* includes a circle 64 representing the second ply of composite material with fibers oriented at a −45° angle, as indicated by the arrow in FIG. 7B.

Figure 7C:
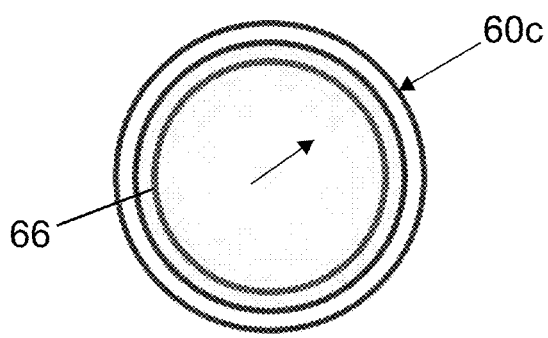

After the second ply of composite material is in place, the on-site technician can place a third (next larger) ply of composite material over the second ply. FIG. 7C shows a ply lay-up map 60*c* which can be projected onto the repair area to guide the technician. The ply lay-up map 60*c* includes a circle 66 representing the third ply of composite material with fibers oriented at a +45° angle, as indicated by the arrow in FIG. 7C.

Figure 7D:
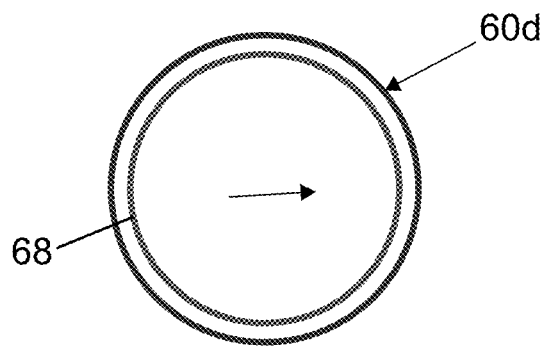

After the third ply of composite material is in place, the on-site technician can place a fourth (next larger) ply of composite material over the third ply. FIG. 7D shows a ply lay-up map 60*b* which can be projected onto the repair area to guide the technician. The ply lay-up map 60*d* includes a circle 68 representing the fourth ply of composite material with fibers oriented at a +90° angle, as indicated by the horizontal arrow.

Figure 7E:
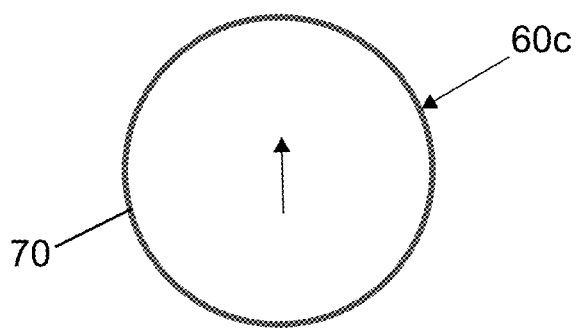

After the fourth ply of composite material is in place, the on-site technician can place a fifth (and last) ply of composite material over the fourth ply. FIG. 7E shows a ply lay-up map 60*e* which can be projected onto the repair area to guide the technician. The ply lay-up map 60*e* includes a circle 70 representing the fifth ply of composite material with fibers oriented at a 0° angle, as indicated by the vertical arrow.

Once all the plies have been properly nested, the technician can be guided (locally via projections or remotely via the expert) to place the vacuum bagging, heat blanket and other assembly components over the repair area for consolidation and curing of the plies of composite material.

For the purpose of illustration, a repair process 100 will now be described with reference to the flowchart shown in FIGS. 8A and 8B. This flowchart identifies various operations of a remote advance repair guidance process in accordance with one embodiment.

Figure 8A:
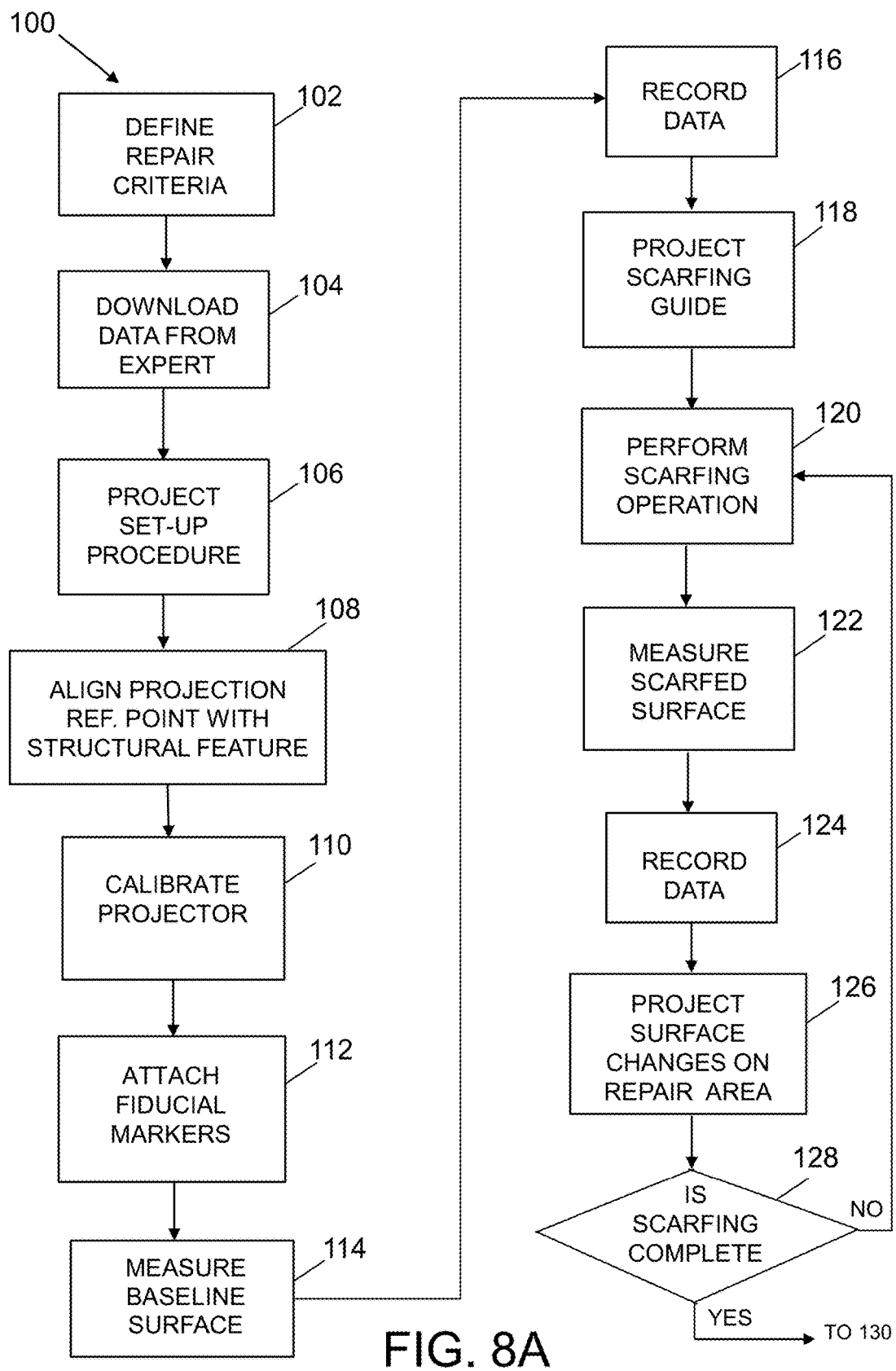
FIGS. 8A and 8B are diagrams forming respective portions of a flowchart identifying operations of a remote advance repair guidance process in accordance with one embodiment.

Referring to FIG. 8A, the first step 102 of the process comprises defining the repair criteria, which is typically performed by a qualified repair expert. This step includes the operations of determining the part configuration in the area of the defect, identifying any interfering structure which needs to be removed, determining the depth and configuration of the defect, and selecting (or designing) the method and details of the repair (i.e., the repair plan). A set-up guide (including three virtual fiducial markers and set-up instructions) is then downloaded from the remote workstation to the on-site PC controller (step 104) and projected onto the fuselage surface (step 106). The line of sight of the projector can be adjusted manually by the on-site technician until a reference point in the projected image is aligned with a structural feature on the fuselage (step 108). Then the size and orientation of the region of projection can be adjusted to calibrate the projected image to the fuselage coordinate system (step 110). The technician then attaches three fiducial markers on the fuselage surface at locations indicated by the virtual fiducial markers in the calibrated projected image (step 112).

The technician then operates the profilometer to acquire baseline surface measurements of the area where the defect is located (step 114). The surface measurement data is recorded by the on-site PC controller and sent to the remote workstation (step 116). The remote expert then downloads a scarfing guide (including a scarfing map and instructions) to the on-site PC controller, which scarfing guide is projected onto the repair area (step 118). Using the scarfing guide, the technician removes some of the composite material from the repair area by scarfing (step 120). After a period of time, the technician stops scarfing and again uses the profilometer to measure the surface of the repair area (step 122). This updated surface measurement data is again recorded and uploaded (step 124). The remote expert then compares those measurements to the baseline measurements to determine the actual current scarfing depth in the scarfed regions. The remote expert can compare the current scarfing depths to the target scarfing depths for the particular repair plan being implemented. As a result of this comparison, the remote expert can identify any region which is under- or overscarfed and then send an updated scarfing map containing visual cues indicating regions where scarfing is not deep enough, at the correct depth, or too deep. Changes in the surface due to scarfing are projected back onto the repair area as color changes, showing visually the scarf depth (step 126). At this stage a determination can be made whether scarfing is complete (i.e., sufficiently deep) or not (step 128). If not, then the technician returns to step 120 and uses the projected color changes as a guide to where to remove additional composite material.

Figure 8B:
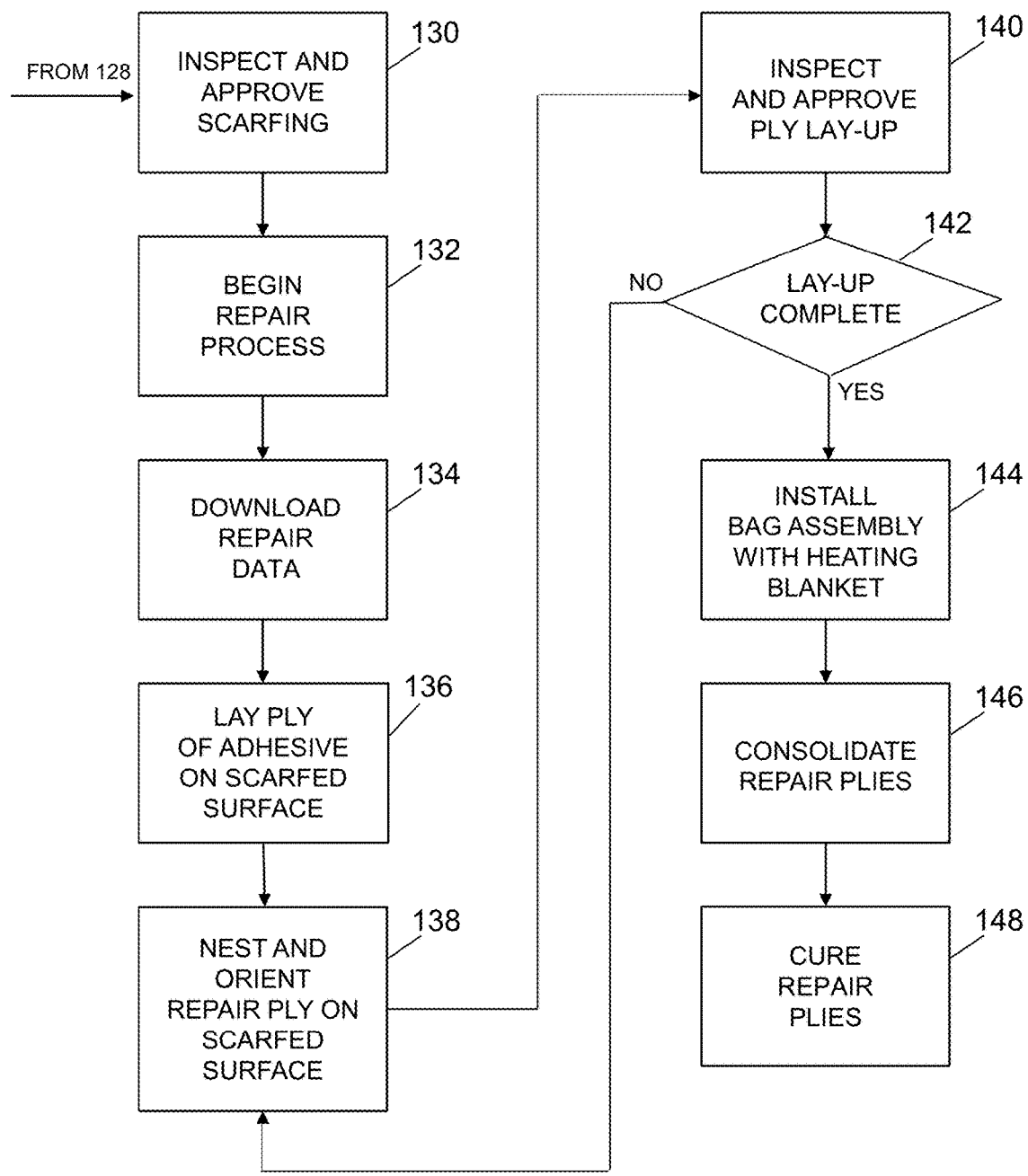

If scarfing is complete, then the repair process continues as shown in FIG. 8B. The scarfed area is inspected by the remote expert (step 130) using images acquired by the video camera and the thermogram radiometer. If the results are satisfactory, the scarfing is approved by the remote expert and the actual repair process is begun (step 132). A repair guide is downloaded from the remote workstation to the on-site PC controller and projected onto the fuselage surface (step 134). The technician lays a ply of adhesive onto the scarfed area (step 136). After the adhesive has been compacted, the technician orients and nests a ply of composite material on top of the scarfed surface (step 138). The remote expert inspects and approves the ply lay-up (step 140). A determination is made whether the ply lay-up is complete in step 142. If not, then the process returns to step 138. If the ply lay-up is complete, then the technician will install the bagging assembly with heating blanket (step 144). Then the repair plies are consolidated (step 146) and cured (step 148).

While systems and processes for enabling an off-site expert to interact with an on-site technician during repair of composite structure have been described with reference to various embodiments, it will be understood by those skilled in the art that various changes may be made and equivalents may be substituted for elements thereof without departing from the scope of the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising at least one processing unit (e.g., a central processing unit, an integrated circuit or an arithmetic logic unit).

As used in the claims, the term "location" comprises position in a three-dimensional coordinate system and orientation relative to that coordinate system. As used in the claims, the term "taper" refers to a line that is not perfectly straight. For example, a taper may deviate from straight due to waviness.

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly. For example, translation of two or more stages may occur concurrently or sequentially or may partially overlap in time.

The invention claimed is:

1. A process for preparing a composite structure for repair, comprising:
   using a three-dimensional optical metrology tool to collect a baseline surface measurement of a surface area of a composite structure to be repaired;
   projecting a scarfing guide onto the surface area, which scarfing guide comprises an initial scarfing map that uses colors and shapes to indicate target scarfing depths for the surface area to be scarfed;
   partially scarfing the surface area while the scarfing guide is being projected onto the surface area;
   using the three-dimensional optical metrology tool to collect a current surface measurement of the partially scarfed surface area;
   comparing the current surface measurement to the baseline surface measurement to determine differences between the current scarfing depths in the partially scarfed surface area and the target scarfing depths;
   generating an updated scarfing map containing visual cues indicating regions where scarfing is not deep enough;
   projecting the updated scarfing map onto the partially scarfed surface area; and
   scarfing the regions where scarfing is not deep enough while the updated scarfing map is being projected onto the surface area.

2. The process as recited in claim 1, wherein the initial scarfing map further indicates respective regions in the area where material should be removed to respective depths which are different.

3. The process as recited in claim 1, wherein the initial scarfing map has outlines corresponding to respective plies of different sizes.

4. The process as recited in claim 1, wherein the scarfing operation comprises sanding to a depth that removes a defect in a first area.

5. The process as recited in claim 4, wherein the scarfing operation further comprises sanding composite material to form a taper that extends from the depth to a second area on the surface that surrounds the first area.

6. The process as recited in claim 1, wherein the scarfing guide further includes a specification of instructions for a procedure for removing composite material from the surface area.

7. A process for forming a depression in a composite structure, comprising at a repair site, comprising:
   (a) using a three-dimensional optical metrology tool to measure a first three-dimensional profile of an area of a surface of a composite structure to be repaired;
   (b) projecting an initial map onto the area that uses colors and shapes to indicate target depths for regions where material is to be removed from the composite structure;
   (c) removing composite material from the area while the initial map is being projected onto the area;
   (d) using the three-dimensional optical metrology tool to measure a second three-dimensional profile of the area after composite material has been removed in step (c);
   (e) determining current depths in respective regions of the area where composite material has been removed based on measurements made in step (d);
   (f) identifying regions of the area in which the respective current depth is less than a respective target depth;
   (g) generating an updated map that indicates the regions identified in operation (f) where the current depth is less than the target depth;
   (h) projecting the updated map onto the area of the composite structure;
   (i) adjusting a location and a size of the projected updated map so that projected images of the regions identified in operation (f) overlie and are registered with respective regions of the area of the composite structure; and
   (j) removing additional composite material from the respective regions in the area of the composite structure on which the projected images were overlaid in operation (i),
   wherein operations (a) through (d) and (h) through (j) are performed at the repair site and operation (e) through (g) are performed at a remote location.

8. The process as recited in claim 7, wherein operations (b) through (h) are iterated until no regions are identified in operation (d).

9. The process as recited in claim 1, wherein the updated scarfing map further contains a visual cue indicating a region where scarfing is too deep.

10. The process as recited in claim 1, wherein the updated scarfing map further contains a visual cue indicating a region where the current scarfing depth matches the target scarfing depth.

* * * * *